(12) United States Patent
Gibson et al.

(10) Patent No.: US 7,917,548 B2
(45) Date of Patent: Mar. 29, 2011

(54) UNIVERSAL PARSING AGENT SYSTEM AND METHOD

(75) Inventors: Alexander G. Gibson, West Richland, WA (US); Anne Schur, Richland, WA (US); James C. Brown, Kennewick, WA (US); Wendy E. Cowley, Richland, WA (US); Nicholas O. Cramer, Kennewick, WA (US); Dennis L. McQuerry, Richland, WA (US); Patricia A. Medvick, Kennewick, WA (US); Mark A. Whiting, Richland, WA (US); Marie V. Whyatt, West Richland, WA (US)

(73) Assignee: Bottelle Memorial Institute, Richland, WA (US)

( * ) Notice: Subject to any disclaimer, the term of this patent is extended or adjusted under 35 U.S.C. 154(b) by 864 days.

(21) Appl. No.: 10/714,541

(22) Filed: Nov. 14, 2003

(65) Prior Publication Data

US 2005/0108267 A1    May 19, 2005

(51) Int. Cl.
*G06F 17/30* (2006.01)
(52) U.S. Cl. .................. 707/805; 707/804; 715/234
(58) Field of Classification Search .................. 707/100, 707/102, 101, 796, 803, 804, 805, 807, 809, 707/810, 811; 715/513, 522, 523, 781, 700, 715/234, 239, 235; 709/202
See application file for complete search history.

(56) References Cited

U.S. PATENT DOCUMENTS

| 5,909,570 | A | * | 6/1999 | Webber ......................... 703/13 |
| 6,240,407 | B1 | | 5/2001 | Chang et al. |
| 6,252,587 | B1 | | 6/2001 | Purple |
| 6,480,865 | B1 | | 11/2002 | Lee et al. |
| 6,484,162 | B1 | | 11/2002 | Edlund et al. |
| 6,487,566 | B1 | | 11/2002 | Sundaresan |
| 6,618,725 | B1 | | 9/2003 | Fukuda et al. |
| 6,738,780 | B2 | * | 5/2004 | Lawrence et al. ............. 707/101 |
| 7,287,018 | B2 | * | 10/2007 | Lennon ............................. 707/2 |
| 7,328,219 | B2 | * | 2/2008 | Urquhart et al. ............... 707/101 |
| 2002/0143821 | A1 | * | 10/2002 | Jakubowski ................... 707/522 |
| 2002/0169803 | A1 | * | 11/2002 | Sampath et al. ............... 707/513 |
| 2003/0167162 | A1 | | 9/2003 | Simpson et al. |

(Continued)

FOREIGN PATENT DOCUMENTS

EP        1320 038 A2    6/2003

(Continued)

OTHER PUBLICATIONS

Ling Lui, XWRAP: An XML-Enabled Wrapper Construction System for Web Information Services, Data Engineering 2000 Proceedings 16th Intl. Conf. San Diego CA Feb. 29-Mar. 3, 2000 IEEE Comput Soc p. 611-621 XP-001080750 ISBN: 0-7695-0506-6.

(Continued)

*Primary Examiner* — Greta L Robinson
(74) *Attorney, Agent, or Firm* — Douglas E. McKinley, Jr.

(57) ABSTRACT

A system and method for extracting and converting data from one or more information sources into a common format. The method comprises receiving the information sources, receiving at least one pattern descriptor selected from a graphical user interface, and receiving one or more templates with each templates having at least one pattern descriptor. The method then proceeds to apply the one or more templates to the information sources. The method generates the plurality of data in a common format by parsing the information sources with the templates. The method stores the data in the common format.

25 Claims, 8 Drawing Sheets

U.S. PATENT DOCUMENTS

2003/0217096 A1* 11/2003 McKelvie et al. ............ 709/202
2004/0181753 A1* 9/2004 Michaelides ................. 715/523

FOREIGN PATENT DOCUMENTS

EP 1349 083 A1 10/2003
WO WO 00/77609 A1 12/2000

OTHER PUBLICATIONS

Sahuguet A et al "Building Lightweight Wrappers for Legacy Web Data Sources Using W4F". Procedings of the International Conference on Very Large Data Bases, 1999, p. 738-741 XP001080774.

* cited by examiner

UNIVERSAL PARSING AGENT SYSTEM AND METHOD

BACKGROUND

1. Field of Invention

The invention is related to analyzing a plurality of information sources having different formats. More particularly, the invention is related to systems and methods that parse the plurality of information sources into a common format.

2. Description of Related Art

Data that is analyzed by a user often arrives from various sources in various forms and in massive amounts. Typically, users struggle with the problem of getting the proper amount of the proper pieces of the desired data into the proper format for a particular software application. To overcome this problem, users spend a substantial amount of time finding the desired data, and then formatting the data for a particular software application. This problem is referred to hereinafter as the data ingest problem.

One of the most significant problems with the data ingest problem is identifying the desired data and then converting the desired data into a format that can be imported to the appropriate software application. For example, many software applications used in scientific and business settings can import certain types of formatted data automatically. However, substantially similar data, which is not formatted properly must be reformatted for importing into the desired software application. This process of reformatting is an expensive process that occupies the user's time and demands a software programmer's expertise.

Typical solutions for the data ingest problem are often hard coded for a single purpose and there is no reusability of the software. Additionally, slight variation in data can cause significant problems to solutions that are hard coded for a single purpose. In many instances commercial parsing software for reformatting data does not exist. Thus, the burden is on the user to re-format the desired data. Alternatively, the user may hire a programmer to generate or modify software that can reformat the desired data. Both of these solutions are relatively expensive because they take time to implement and require user resources, require developer time, and give the user a solution, which the user can not modify.

SUMMARY

A method for extracting and converting data from one or more information sources into a common format. The method comprises receiving the information sources, receiving at least one pattern descriptor selected from a graphical user interface, and receiving one or more templates with each template having at least one pattern descriptor. The method then proceeds to apply the one or more templates to the information sources. The method generates the plurality of data in a common format by parsing the information sources with the templates. The method stores the data in the common format.

A system for extracting and converting data from one or more information sources into a common format is also disclosed. The system includes a memory, an input device and a processor. The memory is configured to receive the information sources and store the templates. The input device is configured to receive the pattern descriptors from a user interacting with the graphical user interface. The processor is programmed to apply the templates to the information sources, to generate data in a common format by parsing the plurality of information sources with the templates, and communicate the data in the common format for storage.

The graphical user interface comprises a first button that permits the user to receive the information sources, a second button that permits the user to select a pattern descriptor, a third button that permits a user to select one or more templates, and a display window configured to display the data in the common format.

BRIEF DESCRIPTION OF THE DRAWINGS

Embodiments for the following description are shown in the following drawings.

DESCRIPTION

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the claims. The following detailed description is, therefore, not to be taken in a limited sense.

Note, the leading digit(s) of the reference numbers in the Figures corresponds to the figure number, with the exception that the same reference numbers identifies identical components, which appear in multiple figures.

The parsing systems and methods have been developed to provide a user-defined, flexible, template-based approach to information extraction, and translation for structured, semi-structured and unstructured information sources. Thus, the illustrative systems and methods described herein are configured to handle structured information sources and semi-structured information sources. For purposes of this patent, the term "structured information sources" refers to information that is organized in one or more databases and has clearly defined fields, columns and rows. The term "semi-structured information sources" refers to information sources that are less organized than structured information sources, but which remains more organized than unstructured information sources. "Unstructured information sources" are information sources that do not appear to follow any rules, format, or sequence.

It shall be appreciated by those of ordinary skill in the art having the benefit of this disclosure that the illustrative systems and methods described herein may be adapted to apply to unstructured information sources. The unstructured information sources may possess one or more patterns that were not visible during initial observations, but which become visible using the template based parsing techniques described hereinafter. Thus, unstructured information sources may also be parsed using elements of the systems and methods described in this patent application.

Furthermore, those skilled in the art having the benefit of this disclosure shall appreciate that these illustrative systems and methods can be applied to a variety of applications that require parsing information sources and generating a data output which has a common format. Further still, the illustrative embodiment describes an illustrative graphical user interface (GUI) for parsing information sources.

Figure 1:
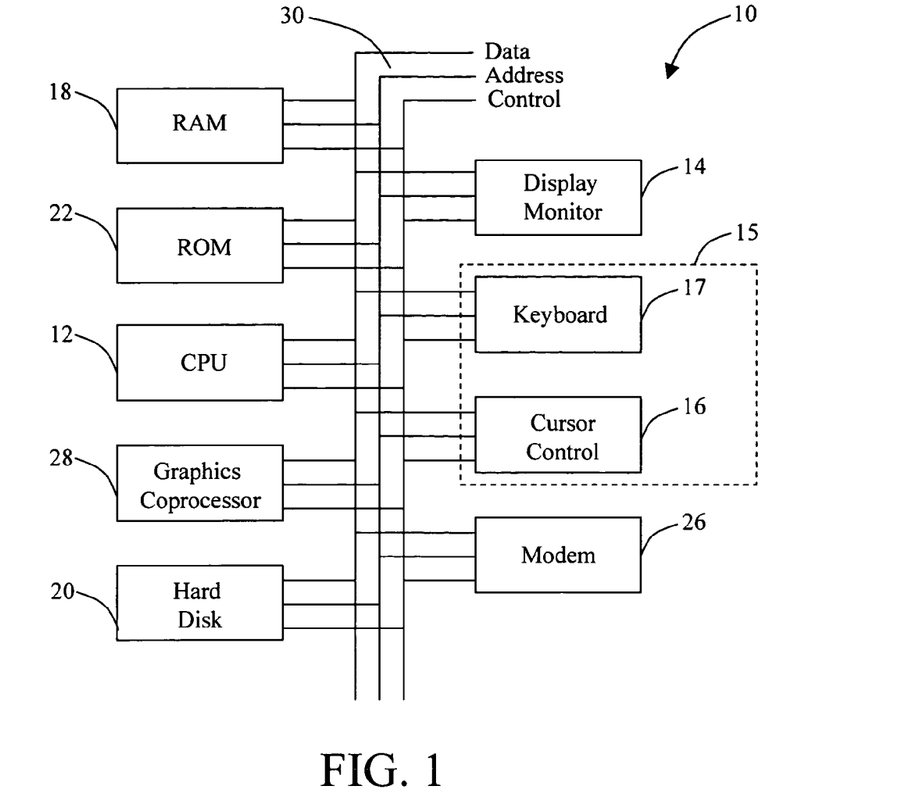
FIG. 1 is an illustrative general purpose computer.

Referring to FIG. 1 there is shown an illustrative general purpose computer 10 suitable for implementing the systems and methods described herein. The general purpose computer 10 includes at least one central processing unit (CPU) 12, a display such as a monitor 14, and an input device 15 such as cursor control device 16 or keyboard 17. The cursor control device 16 can be implemented as a mouse, a joy stick, a series of buttons, or any other input device which allows user to control the position of a cursor or pointer on the display monitor 14. Another illustrative input device is the keyboard 17. The general purpose computer may also include random access memory (RAM) 18, hard drive storage 20, read-only memory (ROM) 22, a modem 26 and a graphic co-processor 28. All of the elements of the general purpose computer 10 may be tied together by a common bus 30 for transporting data between the various elements.

The bus 30 typically includes data, address, and control signals. Although the general purpose computer 10 illustrated in FIG. 1 includes a single data bus 30 which ties together all of the elements of the general purpose computer 10, there is no requirement that there be a single communication bus which connects the various elements of the general purpose computer 10. For example, the CPU 12, RAM 18, ROM 22, and graphics co-processor might be tied together with a data bus while the hard disk 20, modem 26, keyboard 24, display monitor 14, and cursor control device are connected together with a second data bus (not shown). In this case, the first data bus 30 and the second data bus could be linked by a bi-directional bus interface (not shown). Alternatively, some of the elements, such as the CPU 12 and the graphics co-processor 28 could be connected to both the first data bus 30 and the second data bus and communication between the first and second data bus would occur through the CPU 12 and the graphics co-processor 28. The methods of the present invention are thus executable on any general purpose computing architecture, but there is no limitation that this architecture is the only one that can execute the methods described.

The system for extracting a plurality of structure data from a plurality of information sources may be embodied in the general purpose computer 10. A memory such as RAM 18, ROM 22, hard disk 20, or any other such memory device can be configured to store data for the methods descried.

In the illustrative system, the memory is configured to receive the plurality of information sources and to store the templates that are used to generate the data having a common format. For the illustrative embodiment, the structured and semi-structured information sources comprise text data that is configured in a variety of different formats. The systems and methods then parse the structured information sources and semi-structured information sources using templates. The templates may be stored in a template library or may be generated for a particular group of text documents.

After parsing the information sources, a plurality of data is generated in which the content is organized, ordered and grouped according to a plurality of pattern descriptors. The data is stored in a common format, which in the illustrative example is an extensible markup language (XML) format. As described in further detail below, the data having a common format can be stored in a storage bin such as an input bin, a wait bin, an incomplete bin, and a complete bin.

The input device 15 receives an instruction from the user through the GUI. The GUI is configured to receive an instruction in which the user selects or defines one or more pattern descriptors. A pattern descriptor is a pattern that is used by the universal parsing agent to parse information sources. A pattern descriptor shares some of the functions of a "tag". A tag is a command inserted in a document that specifies how the document or portion of the document should be formatted. Tags are used by format specifications such as Standard Generalized Markup Language (SGML) and Hypertext Markup Language (HTML). In addition to providing some of the functions of a tag, a pattern descriptor permits a user to define one or more tags and/or patterns using a graphical user interface. As described here, a user accessing the graphical user interface can define the pattern descriptor.

An illustrative user employs the pattern descriptor to generate templates which enable the parsing of data from information sources without having the user program or understand the algorithms used to perform the reformatting of the information sources. By way of example and not of limitation, the illustrative user may be an information analyst. In another illustrative example, the user may be a system integrator or operations analyst.

The processor 12 is programmed to apply the templates to the information sources. A plurality of data having a common format is generated by parsing the information sources with one or more templates. In the illustrative example described in further detail below, the generated data having a common format is stored as a text file. The processor then proceeds to communicate the generated data having a common format to an application configured to receive data having the common format. By way of example and not of limitation, the application is a database application.

Figure 2:
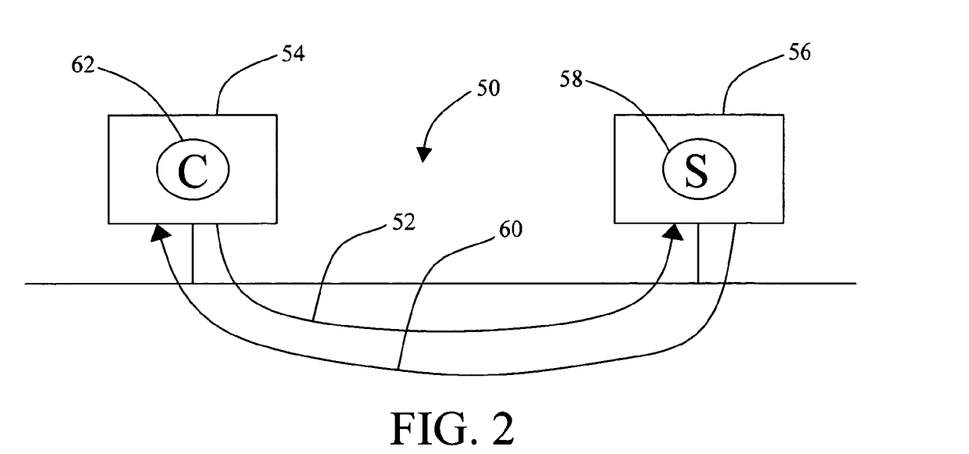
FIG. 2 is an illustrative client-server system.

Referring to FIG. 2, there is shown an illustrative client-server system. The client-server system 50 can be configured to perform similar functions as those performed by the general purpose computer 10. In the client-server system, communication generally takes the form of a request message 52 from a client 54 to the server 56 asking for the server 56 to perform a server process 58. The server 56 performs the server process 58 and sends back a reply 60 to a client process 62 resident within client 54. Additional benefits from use of the client-server system include the ability to store and share gathered information and to collectively analyze gathered information. In another alternative embodiment, a peer-to-peer network (not shown) can used to implement the methods of the invention.

In the illustrative client-server system 50, the client 54 has enabled a web browser that downloads a Java applet from server 56. The downloaded Java applet displays the GUI that is described in further detail below. The client 54 is in communication with server 56, which for this illustrative embodiment is a web server configured to use TCP/IP communication protocols. The web server is configured to host a number of programs such as Java servlet, Java applets, configuration files and other such files. In the illustrative client-server system 50, the server 56 is configured to parse information sources and generate data having a common format. The server 56 then proceeds to communicate the data having a common format to a file server (not shown), which stores the data having a common format as a text file. Those skilled in the art shall appreciate that the parsing can be performed in batches or on a real-time basis.

In operation, the general purpose computer 10, client/server network system 50, and peer-to-peer network system (not shown) execute a sequence of machine-readable instructions. These machine readable instructions may reside in various types of signal bearing media. In this respect, one aspect of the present invention concerns a programmed product, comprising signal-bearing media tangibly embodying a program of machine-readable instructions executable by a digital data processor such as the CPU 12 for the general purpose computer 10.

It shall be appreciated by those of ordinary skill that the computer readable medium may comprise, for example, RAM 18 contained within the general purpose computer 10 or within a server 56. Alternatively the computer readable medium may be contained in another signal-bearing media, such as a magnetic data storage diskette that is directly accessible by the general purpose computer 10 or the server 56. Whether contained in the general purpose computer or in the server, the machine readable instruction within the computer readable medium may be stored in a variety of machine readable data storage media, such as a conventional "hard drive" or a RAID array, magnetic tape, electronic read-only memory (ROM), an optical storage device such as CD-ROM, DVD, or other suitable signal bearing media including transmission media such as digital and analog and communication links. In an illustrative embodiment, the machine-readable instructions may comprise software object code from a programming language such as C++, Java, or other such languages.

Figure 3:
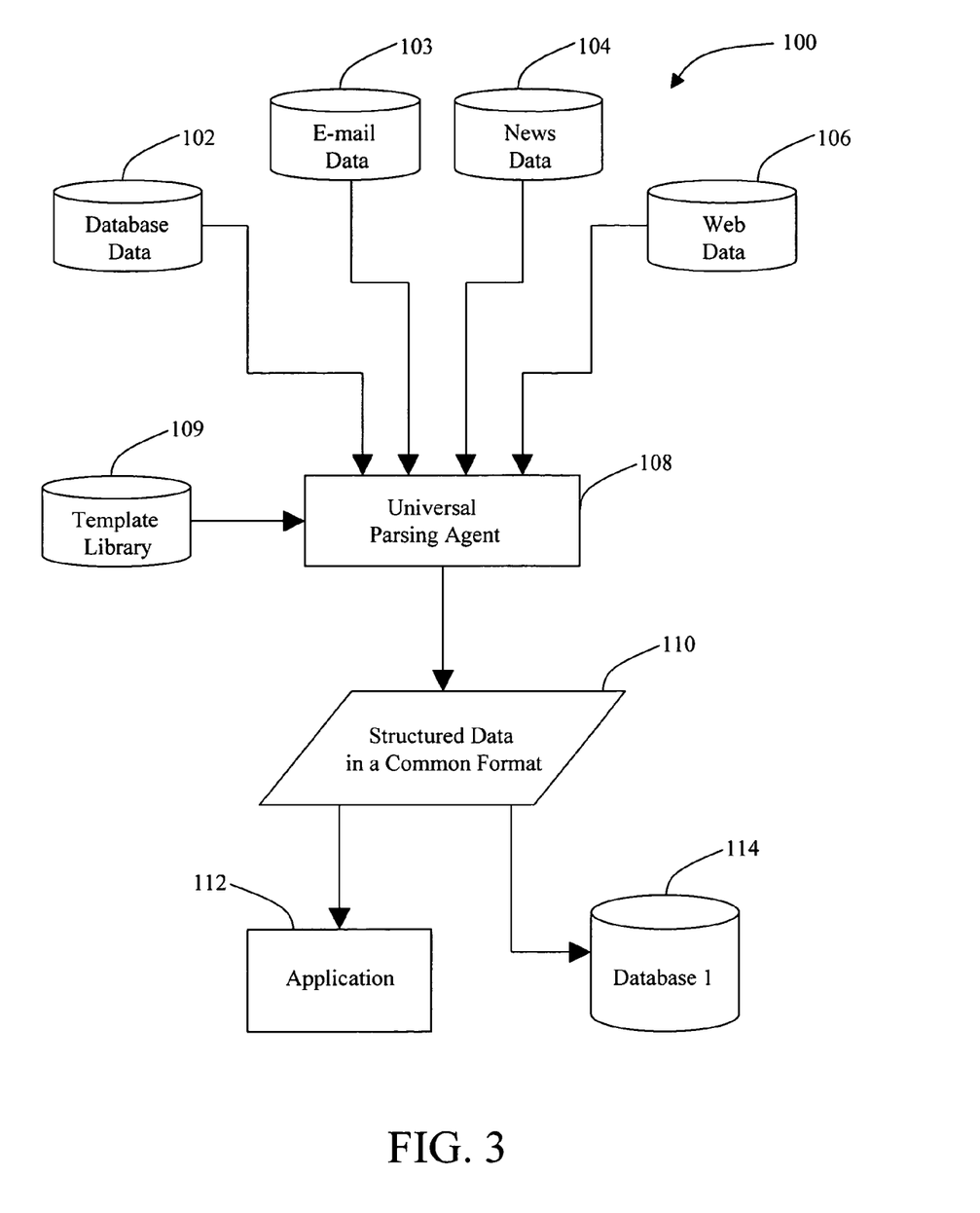
FIG. 3 is a flowchart for the data flow for the universal parsing agent.

Referring to FIG. 3, there is shown a flowchart of the data flow for the universal parsing agent. In general the data flow shows that the universal parsing agent receives a plurality of information sources that comprise database data 102, e-mail data 103, news data 104, and web data 106. For the illustrative embodiment, the structured, semi-structured, and/or unstructured information sources comprise text data that are collected from databases that are inconsistently formatted. Additionally, information sources can also include data that is generated by sensors or instrumentation (not shown). Thus, the term "information source" generally describes the collection of data from a variety of different sources and is used to refer to structured information sources, semi-structured information sources, unstructured information sources and any combination thereof.

The data associated with the information sources is then communicated to the universal parsing agent 108. The universal parsing agent enables the user to define patterns within structured information sources, semi-structured information sources and unstructured information sources. The universal parsing agent looks at patterns and symbols rather than semantic meanings. For structured information sources and semi-structured information sources the universal parsing agent uses the inherent structure of each information source to identify parseable components within the information source. Those skilled in the art having the benefit of this disclosure shall appreciate that the processes that are used for parsing structured and semi-structured information sources may be adapted to unstructured information sources.

To process the information sources the universal parsing agent downloads a template from the template library 109. The template may have previously been generated and is selected by the user from a template library, or the template may be generated by the user from one or more documents.

After receiving the information sources and the user selected template, the universal parsing agent 108 parses the text documents and generates the data having a common format 110. The data having a common format 110 is organized, ordered and grouped according to the template. The data is stored in a common format, which in the illustrative example is an extensible markup language (XML) format. The plurality of data is configured in a common format that can be used to automatically populate an application 112 such as a database 114. Those skilled in the art shall appreciate that a plurality of applications and databases may be populated with the data having a common format that was generated from the universal parsing agent.

Figure 4:
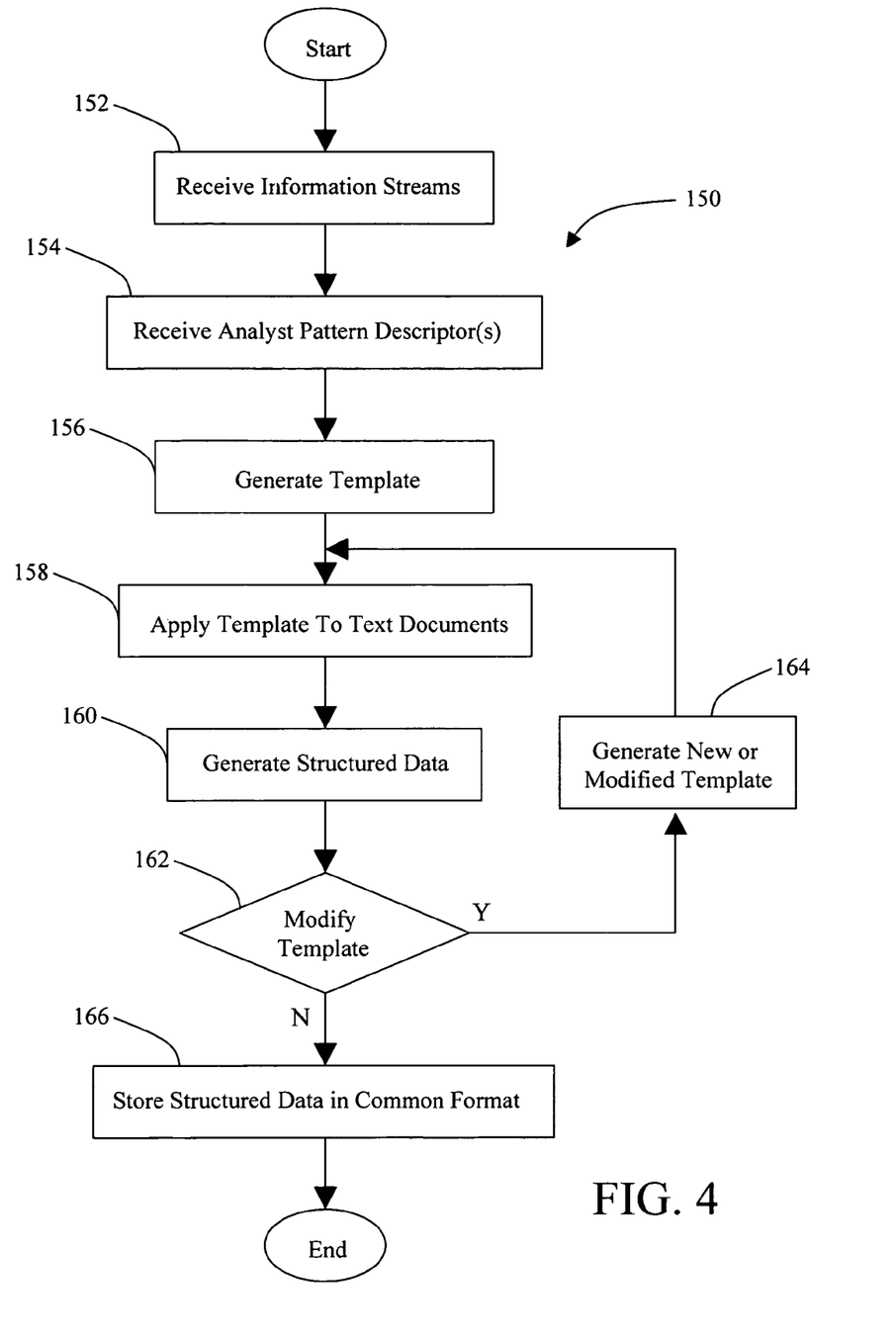
FIG. 4 is a flowchart of the processes performed by the universal parsing agent.

Referring to FIG. 4, there is shown a flowchart 150 of the processes performed by the universal parsing agent. At block 152, the flowchart shows a plurality of information sources being received by the universal parsing agent. The method then proceeds to block 154 in which at least one pattern descriptor is selected from a graphical user interface. Additionally, the user can create one or more pattern descriptors with the graphical user interface. The user is permitted to select at least one pattern descriptor or define their own pattern descriptor. Thus, the pattern descriptor is a user defined pattern descriptor.

The user-defined pattern descriptors are then used to generate a user-defined template as shown in block 156. In the illustrative embodiment the information sources comprise text documents. The template matches any pre-defined pattern of ASCII text or symbols with the text documents in the information sources. The template can be generated by having the user select one file, and then having the user select one or more pattern descriptors from within the selected file. Thus, the user is permitted to define one or more pattern descriptors without the assistance or intervention of a programmer. Alternatively, the user can select a template from a template library, and the process of generating a user-defined template shown in block 156 is not necessary.

At block 158, the method applies one or more templates to the information sources and generates a plurality of data in a common format such as XML. In the illustrative embodiment, each template is comprised of an XML schema that is defined by the user with pattern descriptors. Schemas define the characteristics of classes of objects. For example in Standard Generalized Markup Language (SGML) terminology, a text document has a document type and the formal definition that describes each document type is referred to as a document type definition (DTD). Thus, the DTD defines a set of valid tags for a document using standardized semantics and language.

In XML, the schemas define the characteristics of classes of objects. XML schemas permit XML document types to be described using flexible XML tags rather than the standardized SGML tags. Typically, programmers develop the XML schemas and the algorithms for implementing the XML schemas are coded by a programmer. The universal parsing agent permits users with limited programming skills to use a GUI to modify or generate XML schemas, which are also referred to as templates. After applying the templates to the information source, the method proceeds to block 160.

At block 160, the plurality of data having a common format is generated by parsing the information sources with one or more templates. The parsing of the information sources can be performed in any natural language such as Chinese, Japanese, French, and English at one time. The parsing of the information sources may be performed without having to replicate the parsing process. Thus, the parsing process is not repeated for each natural language.

At decision diamond 162, the user decides whether to modify the template that was employed to perform the parsing. If the user decides to modify the template, the method proceeds to block 164 where a new template may be generated or an existing template can be modified. The new or modified template can then be applied to the information sources.

If the user decides not to modify the template, the method proceeds to block 166 where the data is stored in a common format. In the illustrative example, the data having a common farmat may be stored in one of four possible storage bins that comprise an input bin, a wait bin, an incomplete bin and a complete bin. The storage options are described in further detail below. In the illustrative example, the data having a common format is stored as a text file on a file server. The user then has the opportunity to communicate the data havin a common format to an application that is configured to receive data having the common format. For illustrative purposes only, the application may be relational database application or other database application.

Figure 5:
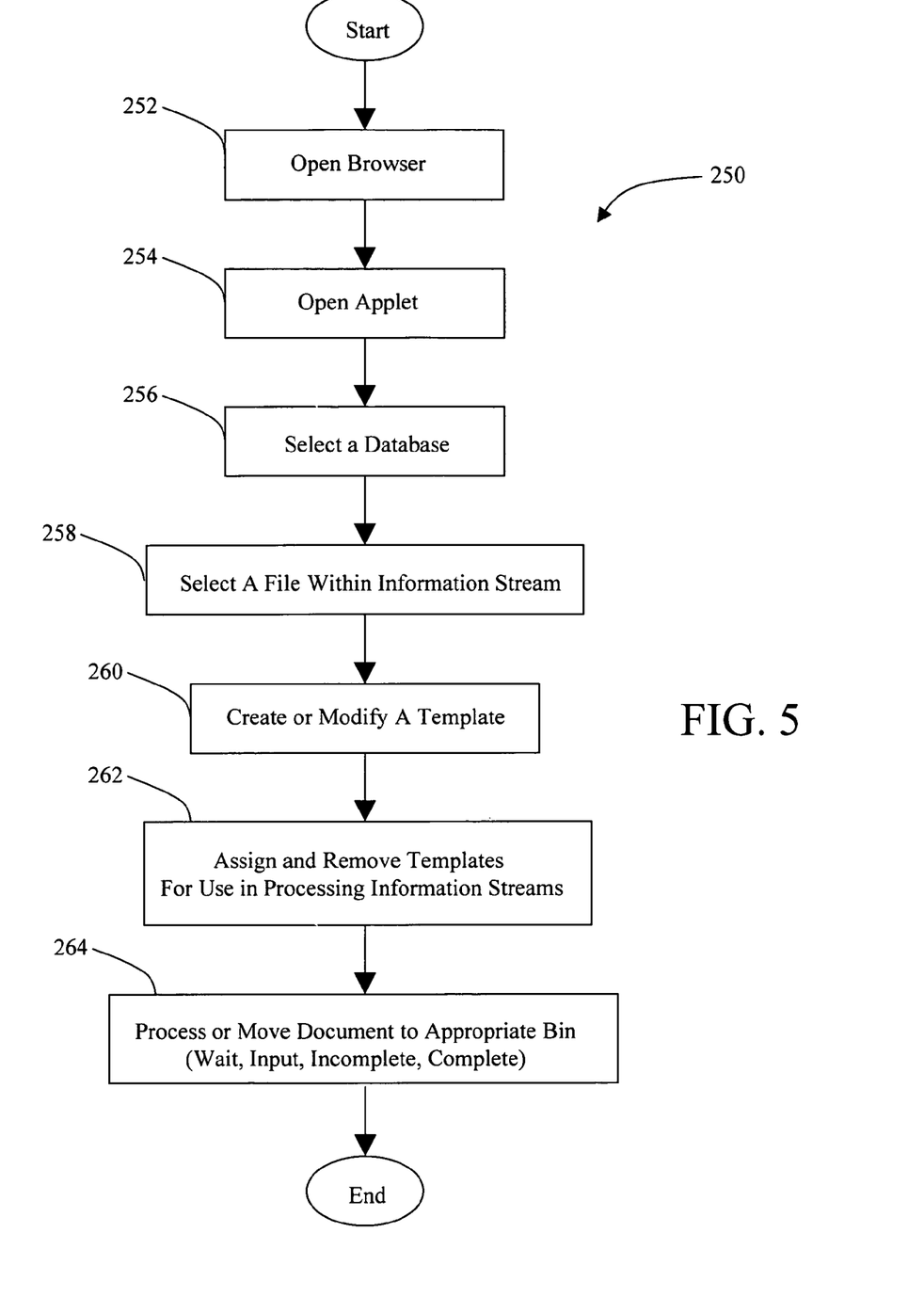
FIG. 5 is a flowchart of the illustrative operations that are performed by a user.

Referring to FIG. 5 there is shown a flowchart of the illustrative operations 250 that are performed by a user. The illustrative operations are initiated at block 252 when the user opens a browser at the client 54. At block 254, the user proceeds to open a universal parsing agent applet within the browser. At block 256, the user identifies a desired database within the GUI for analysis. The user then proceeds to block 258 where the user selects a file from the list of files that is associated with the selected database.

At block 260, the user analyzes the selected file and creates a template or modifies a template. In the illustrative embodiment, the new template is created by having the user select an area in the selected file that contains a plurality of pattern descriptors the user desires to add to a template. The user selects the patterns, i.e. pattern descriptors, within the template. In the illustrative embodiment, the pattern descriptors using regular expression operators such as standard PERL pattern operators or alternatively ASCII text. The generation of the template is based on identifying patterns in the illustrative text documents. With respect to text documents, the defining of patterns may be performed using the traditional structure of the document. In an illustrative example, a user defines a header area, a main message area, and a footer area for the document.

At block 262, the user can take newly created templates and assign them to the illustrative Input bin. For the illustrative embodiment, the template is be used to perform batch processing of any of the selected information sources. Additionally, templates that have been found to be unsuccessful may be removed.

At block 264, the data having a common format is generated using the method described above. The generated data having a common format can then be stored in the wait bin, the incomplete bin, or a complete bin. The waiting bin permits the user to view files that matched required items in a template, thereby permitting the user to manually revise the pattern descriptor for a modified template or to designate the file as complete. The incomplete bin lists all files where no direct matches were found with the available templates. For files in the incomplete bin, the user views these files and creates templates to parse these "incomplete" files, and uses new templates to reprocess any failed files. The complete bin lists files that have been successfully parsed and the template that was used to parse it. Additionally, for each storage bin the user has the ability to generate statistical information.

Figure 6:
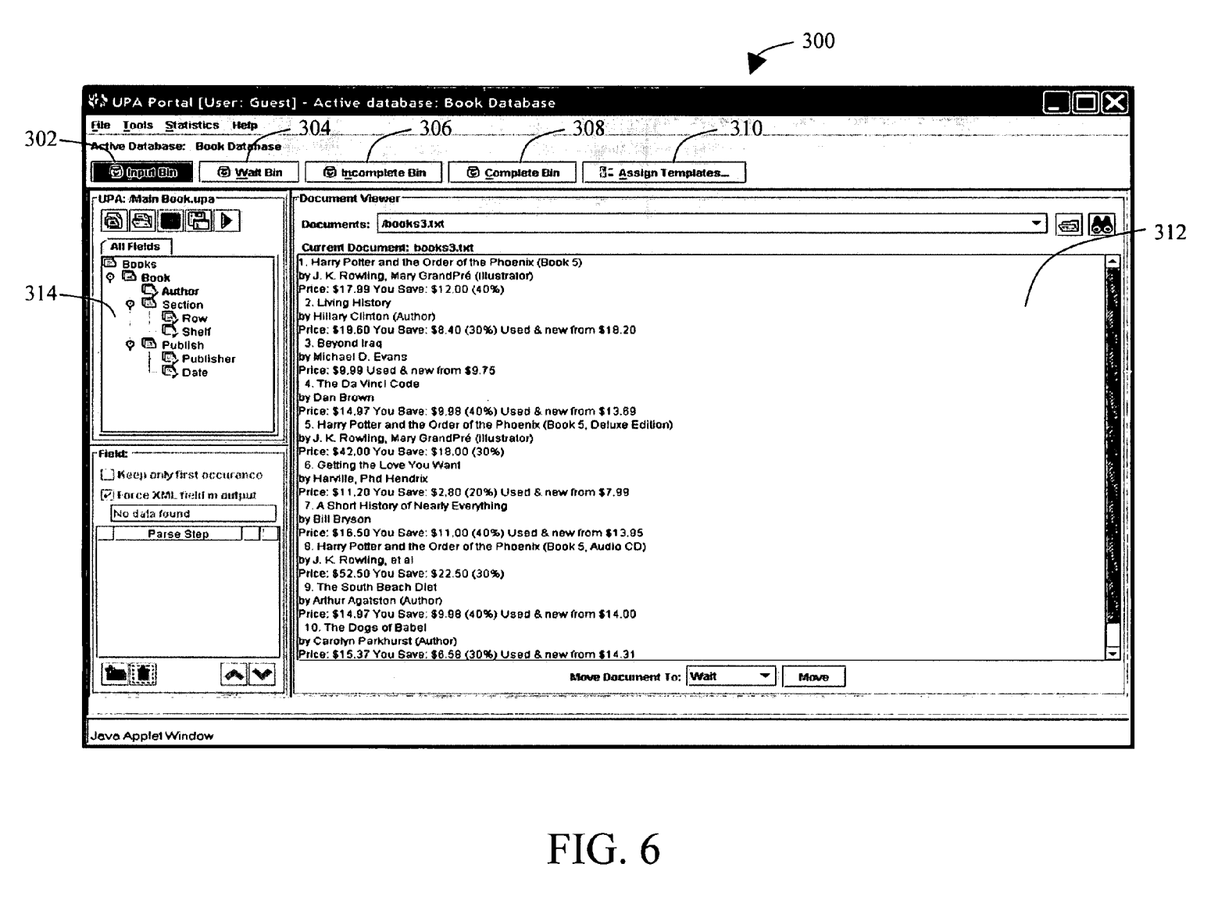
FIG. 6 is a screenshot of an illustrative graphical user interface (GUI).

Referring to FIG. 6, there is shown a screenshot of an illustrative graphical user interface (GUI) 300. Near the top of the GUI, there is shown a plurality of buttons representing the various storage bins, namely, an Input Bin 302, a Wait Bin 304, an Incomplete bin 306, a Complete Bin 308. For the illustrative GUI, the Input Bin 302 permits the user to receive a plurality of information sources having different formats. Additionally, there is an Assign Templates button 310 that permits templates to be added to the template library or to have templates removed from the template library. FIG. 6 reflects that the Input Bin button 302 has been enabled and the display window 312 depicts an illustrative text documents before parsing. An illustrative template for parsing the text document is shown in window 314. The illustrative template comprises a plurality of pattern descriptors such as "Author".

Note,for purposes of this patent, the term "button(s)" include buttons displayed on the GUI, switches, selections made from pull-down menus, and any other user input that is associated with the GUI receiving a user command to perform a task.

Figure 7:
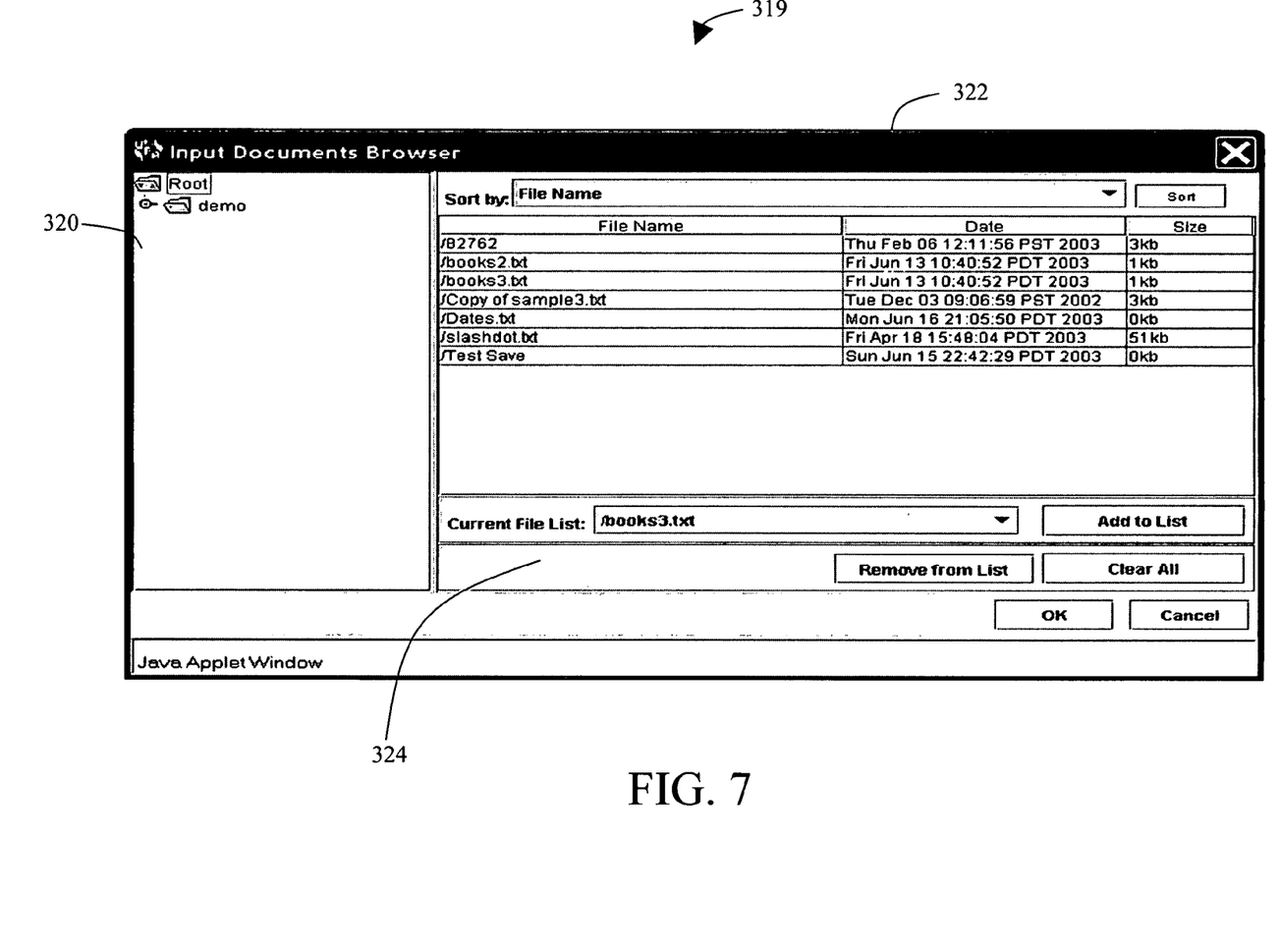
FIG. 7 is a screenshot of the GUI that is used make a template.

Referring to FIG. 7, there is shown a screenshot of the GUI 319 that is used to make a template. To generate a template, the desired folder is selected from display window 320. Once the desired folder is selected, the list of files within the desired folder is displayed in display window 322. The user selects the desired file from the display window 320 and the file is identified in the file selection area 324 that is at the bottom of GUI 319. In the illustrative GUI, the selected file in the file selection is "/books3.txt".

Figure 8:
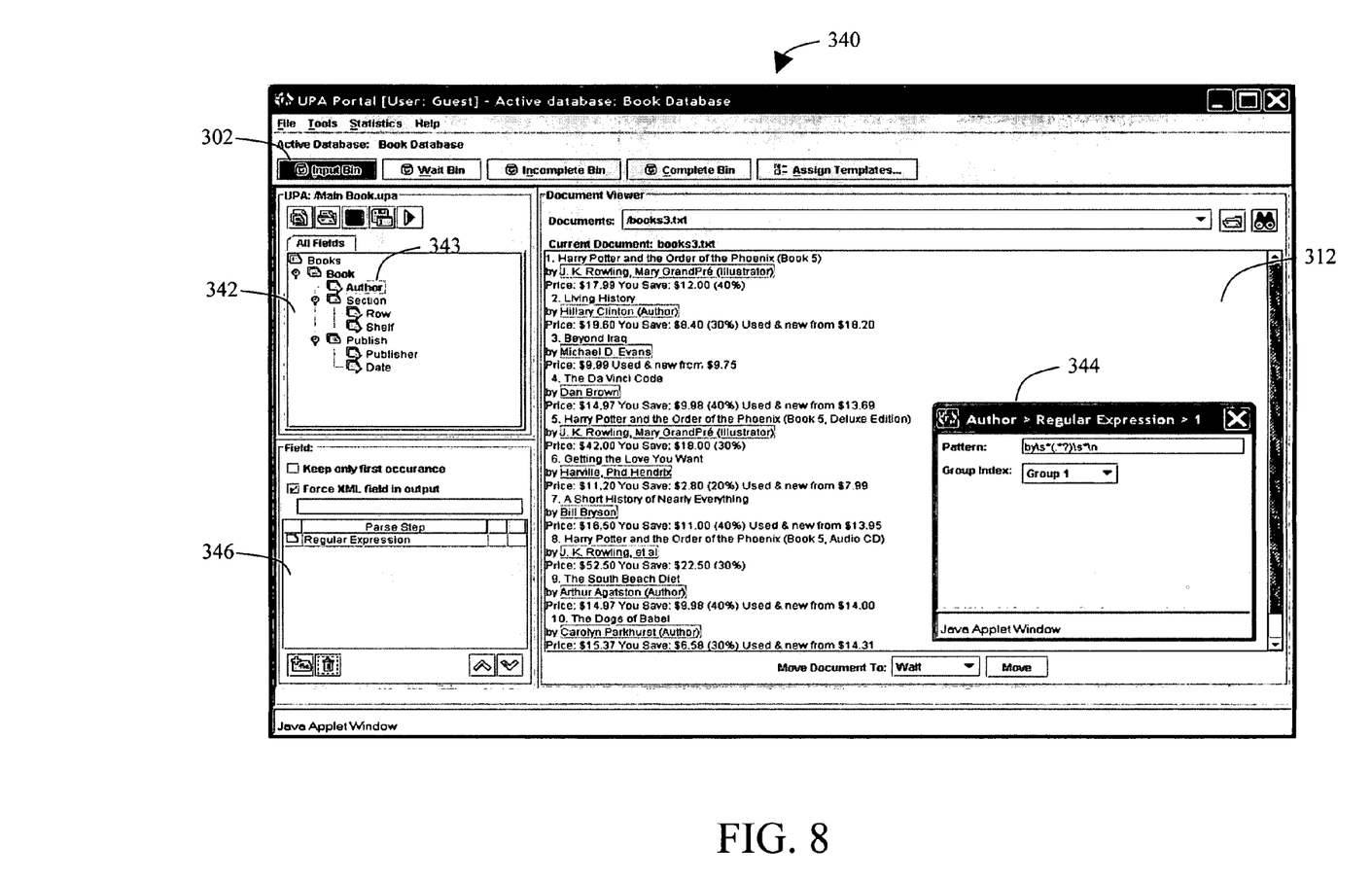
FIG. 8 is a continuation of FIG. 7 in which the GUI 340 is used to generate a template to process documents.

Referring to FIG. 8, there is shown a continuation of FIG. 7 in which the GUI 340 is used to generate a template to process documents. To generate a template the Input Bin 302 button is selected. The display window 312 shows the selected file. The pattern descriptors are shown on the left side of the GUI in window 342. For illustrative purposes only, the "author" pattern descriptor 343 is highlighted. The pattern associated with the author descriptor 343 is shown in window 344 which identifies the author pattern with the expression "by\s*(.?)\s*\n". The display window 312 shows each of the authors in the file in a highlight manner. On the bottom left hand of the GUI, a pattern definition area 346 is shown. The pattern definition area 346 allows the user to create a pattern that will extract values from the text document.

Using the GUI, the user can create templates with existing templates or by starting with a blank template. A pattern helper (not shown) is provided to assist the user in defining patterns or expression that will look for specific information contained in a file. While defining patterns, the user applies principles applied in traditionally structured documents. By way of example and not of limitation, the user may define a header area, the message area, and the footer area of a document. Within each of these main areas the user can perform searches for specific information content.

Additionally, users have the ability to make and save draft templates to work on later. They can also create statistical data about the files being processed. This information tells the user how many files have been parsed in the various categories. It shall be appreciated by those of ordinary skill in the art having the benefit of this disclosure that statistical data can be aggregated to enable the analyst to view trends about user-specified data.

Figure 9:
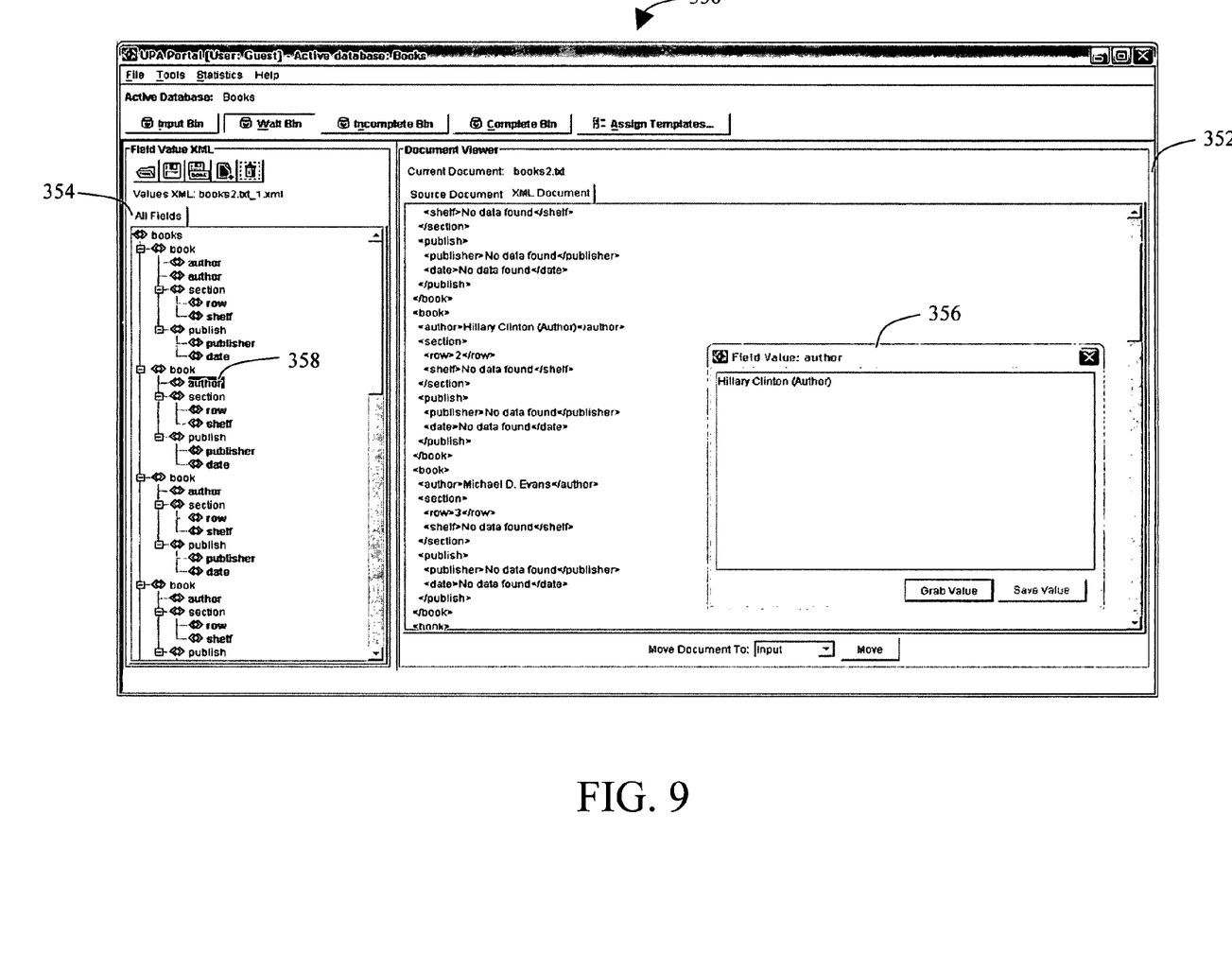
FIG. 9 is a screenshot of the GUI in which data having a common format is displayed.

Referring to FIG. 9, there is shown a screenshot of the GUI 350 in which data having a common XML format is displayed. In this illustrative example, the selected document "book2.txt" has been parsed. The display window 352 shows a plurality of structured data in an XML format. Another window 354 displays the pattern descriptors that are associated with the data file. Yet another window 356 shows the value associated with a particular tag 358.

It shall be appreciated by those skilled in the art having the benefit of this disclosure that the illustrative systems and methods described above have been developed to receive a plurality of information sources that are inconsistently formatted. The universal parsing agent proceeds to apply a user-defined template to generate data configured in a common format that can be used to automatically populate an application such as a database.

Although the description above contains many limitations in the specification, these should not be construed as limiting the scope of the claims but as merely providing illustrations of some of the presently preferred embodiments of this invention. Many other embodiments will be apparent to those of skill in the art upon reviewing the description. Thus, the scope of the invention should be determined by the appended claims, along with the full scope of equivalents to which such claims are entitled.

What is claimed is:

1. A method for extracting and converting data in a computer system from one or more information sources into a common format, comprising:
   receiving said information sources in a computer system;
   receiving at least one pattern descriptor selected from a graphical user interface;
   receiving one or more templates, each of said templates having said at least one pattern descriptor;
   applying said one or more templates to said information sources;
   generating said data in a common format by parsing said information sources with a universal parsing agent that utilizes said one or more templates; and
   storing said data in said common format.

2. The method of claim 1 wherein after storing said data in said common format, said method further comprises communicating said data to an application configured to process said common format.

3. The method of claim 2 wherein said application is a database application.

4. The method of claim 1 wherein said common format for said structured data is a Extensible Markup Language (XML) format.

5. The method of claim 1 wherein before receiving said one or more templates, said method further comprises,
   generating said one or more templates by selecting a file from said information sources, and
   having a user select one or more pattern descriptors to describe said file.

6. The method of claim 5 further comprising permitting said user to define said one or more pattern descriptors.

7. The method of claim 1 wherein before receiving said one or more templates, said method further comprises permitting said user to select one or more templates from a template library.

8. The method of claim 1 wherein said storing of said data in said common format is selected from a group of storage bins consisting of an input bin, a wait bin, an incomplete bin, and a complete bin.

9. The method of claim 1 wherein said information sources are selected from the group of structured information sources, semi-structured information sources, unstructured information sources and combinations thereof.

10. A system for extracting and converting data from one or more information sources into a common format, comprising:
    a memory configured to receive said information sources, said memory configured to store one or more templates wherein each of said templates has at least one pattern descriptor selected from a graphical user interface;
    an input device configured to receive said at least one pattern descriptor from a user interacting with a graphical user interface;
    a processor programmed to:
      apply said one or more templates to said information sources;
      generate said data in said common format by parsing said information sources with a universal parsing agent that utilizes said one or more templates; and
      communicate said data in said common format.

11. The system of claim 10 wherein said processor is configured to communicate said data in said common format to an application configured to process said common format.

12. The system of claim 11 wherein said application is a database application.

13. The system of claim 10 wherein said common format for said structured data is a Extensible Markup Language (XML) format.

14. The system of claim 10 wherein said memory stores a template library from which a user can select one or more templates.

15. The system of claim 10 wherein said memory stores said data in said common format in a storage bin selected from a group of storage bins consisting of an input bin, a wait bin, and incomplete bin, and a complete bin.

16. The system of claim 10 wherein said information sources are selected from the group of structured information sources, semi-structured information sources, unstructured information sources and combinations thereof.

17. A computer readable medium encoded with a computer program having computer-executable instructions for performing a method for extracting and converting data from one or more information sources into a common format, comprising:
    receiving said information sources;
    receiving at least one pattern descriptor selected from a graphical user interface;
    receiving one or more templates, each of said templates having said at least one pattern descriptor;
    applying said one or more templates to said information sources;
    converting said data into said common format by parsing said information sources with a universal parsing agent that utilizes said one or more templates; and
    storing said data in said common format.

18. The computer readable medium encoded with a computer program having computer-executable instructions for performing said method of claim 17 wherein after storing said data in said common format, said method further comprises communicating said data in said common format to an application configured to process said common format.

19. The computer readable medium encoded with a computer program having computer-executable instructions for performing said method of claim 18 wherein said application is a database application.

20. The computer readable medium encoded with a computer program having computer-executable instructions for performing said method of claim 18 further comprising permitting said user to define said one or more pattern descriptors.

21. The computer readable medium encoded with a computer program having computer-executable instructions for performing said method of claim 17 wherein said common format for said structured data is a Extensible Markup Language (XML) format.

22. The computer readable medium encoded with a computer program having computer-executable instructions for performing said method of claim 17 wherein before receiving said one or more templates, said method further comprises, generating said one or more templates by selecting a file from said plurality of information sources, and having a user select one or more pattern descriptors to describe said file.

23. The computer readable medium encoded with a computer program having computer-executable instructions for performing said method of claim 17 wherein before receiving said one or more templates, said method further comprises permitting said user to select one or more templates from a template library.

24. The computer readable medium encoded with a computer program having computer-executable instructions for performing said method of claim 17 wherein said storing of said data in said common format is selected from a group of storage bins consisting of an input bin, a wait bin, an incomplete bin, and a complete bin.

25. The computer readable medium encoded with a computer program having computer-executable instructions for performing said method of claim 17 wherein information sources are selected from the group of structured information sources, semi-structured information sources, unstructured information sources and combinations thereof.

* * * * *

UNITED STATES PATENT AND TRADEMARK OFFICE
CERTIFICATE OF CORRECTION

PATENT NO.         : 7,917,548 B2
APPLICATION NO.    : 10/714541
DATED              : March 29, 2011
INVENTOR(S)        : Gibson et al.

Page 1 of 1

It is certified that error appears in the above-identified patent and that said Letters Patent is hereby corrected as shown below:

Title Page:
Item (73); the name of the Assignee should be corrected to Battelle Memorial Institute instead of Bottelle Memorial Institute Signed and Sealed this
Thirty-first Day of May, 2011

David J. Kappos
*Director of the United States Patent and Trademark Office*